US008408140B2

(12) United States Patent
Vialle et al.

(10) Patent No.: US 8,408,140 B2
(45) Date of Patent: Apr. 2, 2013

(54) DEVICE FOR TRANSPORTING AN OBJECT IN A CELL

(75) Inventors: Herve Vialle, Codolet (FR); Pascal Gire, Bagnols-sur-Ceze (FR)

(73) Assignee: Commissariat A l'Energie Atomique Et Aux Energies Alternatives, Paris (FR)

( * ) Notice: Subject to any disclaimer, the term of this patent is extended or adjusted under 35 U.S.C. 154(b) by 354 days.

(21) Appl. No.: 12/742,072

(22) PCT Filed: Nov. 6, 2008

(86) PCT No.: PCT/EP2008/065075
§ 371 (c)(1), (2), (4) Date: May 7, 2010

(87) PCT Pub. No.: WO2009/060036
PCT Pub. Date: May 14, 2009

(65) Prior Publication Data

US 2010/0288156 A1 Nov. 18, 2010

(30) Foreign Application Priority Data

Nov. 9, 2007 (FR) ..................................... 07 58942

(51) Int. Cl.
*B61J 3/00* (2006.01)
*B65G 25/04* (2006.01)

(52) U.S. Cl. .................................. 104/88.01; 198/750.2

(58) Field of Classification Search ............... 104/88.01, 104/112–117.1, 165–166, 173.2, 174; 198/750.1, 198/750.2, 750.14, 775, 776
See application file for complete search history.

(56) References Cited

U.S. PATENT DOCUMENTS

| | | | | |
|---|---|---|---|---|
| 6,705,457 | B2 * | 3/2004 | Biro et al. | 198/750.2 |
| 7,645,136 | B2 * | 1/2010 | Arai et al. | 432/122 |

FOREIGN PATENT DOCUMENTS

| | | | |
|---|---|---|---|
| FR | 1410330 | A | 9/1965 |
| JP | 11142594 | A | 5/1999 |
| JP | 2005324327 | A | 11/2005 |

OTHER PUBLICATIONS

International Search Report for PCT/EP2008/065075 dated Jan. 20, 2009.

* cited by examiner

*Primary Examiner* — Robert McCarry, Jr.
(74) *Attorney, Agent, or Firm* — Nixon Peabody LLP

(57) ABSTRACT

A device for entering an object into a cell comprises mainly a track for guiding the object and a lifting pod extending the track. It is then possible to use robots and lower them on the floor of the cell to carry out inspection work.

6 Claims, 2 Drawing Sheets

DEVICE FOR TRANSPORTING AN OBJECT IN A CELL

CROSS REFERENCE TO RELATED APPLICATIONS OR PRIORITY CLAIM

This application is a national phase of International Application No. PCT/EP2008/065075, entitled "DEVICE FOR TRANSPORTING AN OBJECT INTO A COMPARTMENT", which was filed on Nov. 6, 2008, and which claims priority of French Patent Application No. 07 58942, filed Nov. 9, 2007.

BRIEF DESCRIPTION OF THE DRAWINGS

Embodiments of the present invention are illustrated by way of example and not limitation in the figures of the accompanying drawings, in which like references indicate similar elements and in which.

DESCRIPTION

The subject of this invention is a device for transporting an object in a cell. One principal application considered at the moment relates to the transport of mobile robots in shielded cells in which there is a hostile environment. There are few openings in such cells, possibly including narrow openings passing through the wall and extending above the floor of the cell. It is then necessary to find how to lower the object once it has passed through the opening in the wall, without any manual action being possible, even by another robot or a remote controlled tool.

The difficulties in entry are less severe through other types of openings, but they are not always present. Shielded doors can thus be passed through simply by rolling or across a passageway, and robots supported on a pod can be lowered through openings passing through the ceiling of the cell using a pulley block. Entries through the openings in which we are interested are usually made by instruments placed on the end of rods, but inspection possibilities are then limited because it is impossible to release the objects in the cell.

The invention offers a better means of inspecting such cells by making it possible to lower mobile robots or possibly other objects into them, after they have passed through the wall of the cell through an opening located above the floor, while being able to retrieve them afterwards. Vehicles must then move freely in the cell, becoming independent of the device.

In a general form, the invention relates to a device for transport of an object in a cell delimited by a wall through an opening in the wall, comprising a track formed in the wall and provided with a cavity for guiding the object with a lower face and side faces, support beams projecting into the cell prolonging the track, a connection between the support beams and the track, a pod under the support beams, a winch outside the cell and unwound winch cables routed along the track and the support beams, and from which the pod is suspended.

Figure 1:
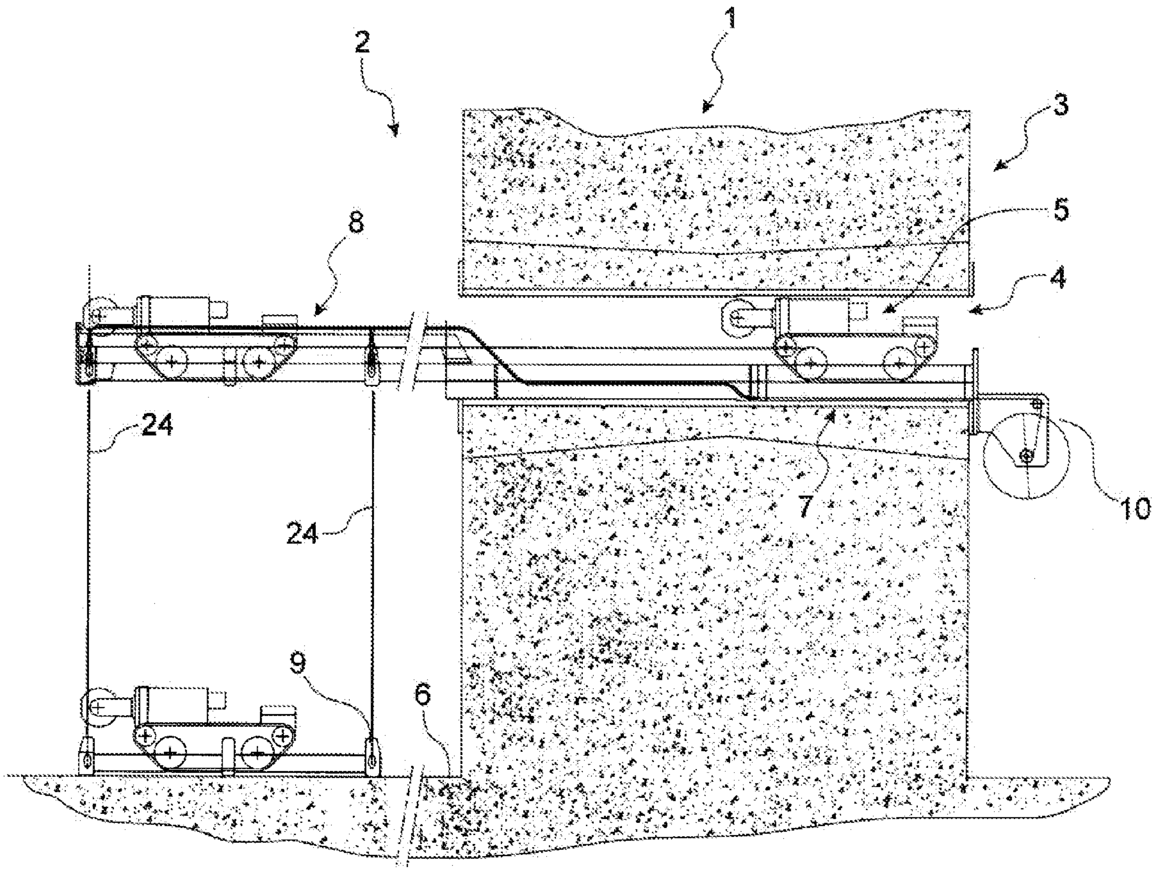
FIG. 1 illustrates a diagram of a cell wall separating the inside of a cell and an external medium with a transport device according to an embodiment formed in a tunnel that passes through the cell wall.
Figure 2:
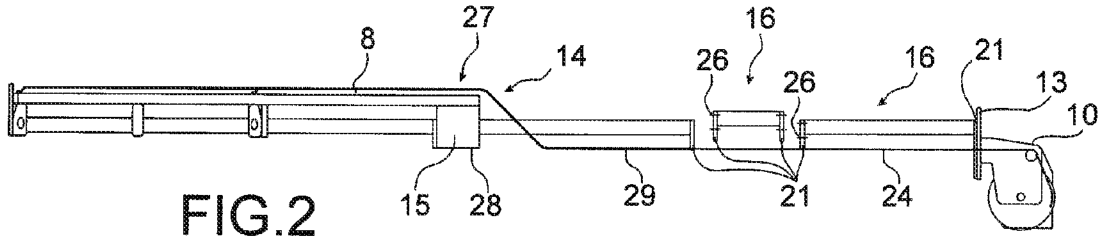
FIG. 2 illustrates a diagram of a side view of a transport device according to an embodiment.
Figure 3:
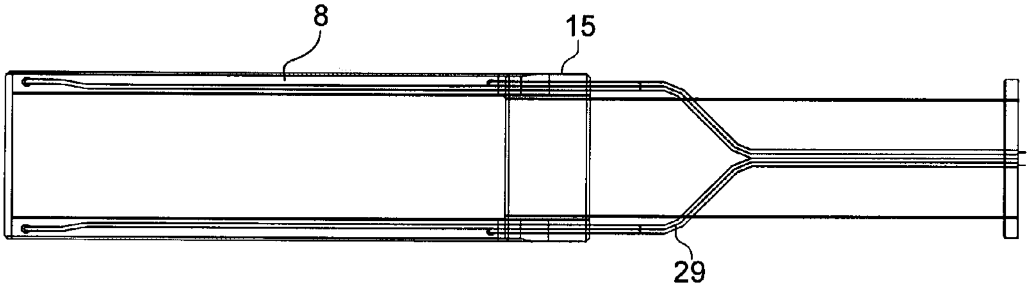
FIG. 3 illustrates a diagram of a top view of a transport device according to an embodiment.
Figure 4:
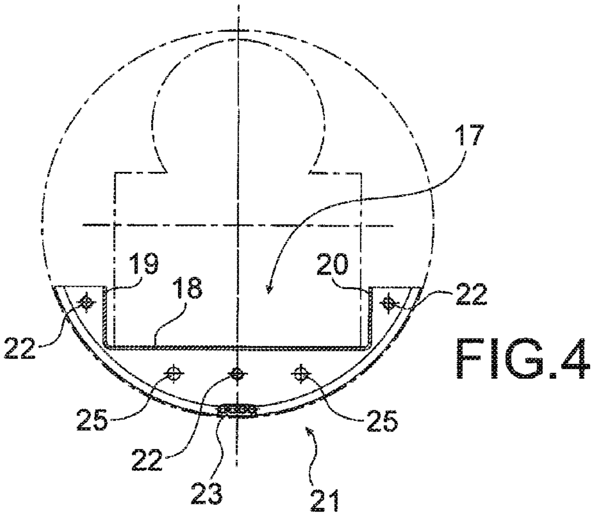
FIG. 4 illustrates a diagram of a front view of a transport device according to an embodiment.

All this and other aspects of the invention will now be described with relation to the figures, in which FIG. 1 shows a general view of the invention and FIGS. 2, 3 and 4 show side, top and front views of the transport track.

FIG. 1 shows a cell wall 1 separating the inside of cell 2 and an external medium 3. An opening 4 in the form of a tunnel passes through the cell wall 1 from one side to the other. A robot 5 that does not form part of the invention can be inserted into the cell 2. Since the opening 4 is above the floor level, the robot needs to be lowered. The transport device comprises a track 7 formed in the opening 4, two support beams 8 extending the track 7 and projecting outside the opening 4 inside the cell 2, a pod 9 suspended from the support beams 8 and a winch 10 located in the external medium 3 and fixed to the track 7.

The track 7 comprises a connection flange 13 to the winch 10. It also comprises a connection module 14 to the support beams 8, which comprises elbows 15 diverging from each other starting from the connection module 14 such that the support beams 8 are separated from each other more than by the width of the track 7 and are also higher than the track 7. Finally, if necessary, the track 7 comprises an arbitrary number of extension modules 16 with possibly different lengths between the connection module 14 and the flange 13 to adapt the length of the track 7 to the length of the opening 4.

The modules 14 and 16 are usually made as follows. They comprise a cavity 17 over their entire length, with dimensions adapted to the dimensions of the object (the robot 5) that will follow the track 7 and comprise a lower support face 18 and two side guide faces 19 and 20. They also comprise connection flanges between modules 21 at their ends, which extend alongside the cavity 17 and under it as far as the walls of the opening 4 so as to fix the position of the track 7. These flanges 21 comprise drillings 22 through which module assembly bolts (not shown) are inserted, a notch 23 through which the unwound cable 24 of the winch 10 passes and that will be described in more detail later, and second drillings 25 on one side of the modules and centring pins 26 on the other side engaging into the second drillings 25. This description excludes the extreme segments of the track 7; the assembly flange 13 of the winch 10 projects beyond the contour of the opening 4 so as to provide a stop position to the track 7 against the wall of the cell 1; and the connection 27 between the connection module 14 and the support beams 8 comprises the elbows 15, and also a sleeve 28 that can slide along the front of the opening 4 projecting more or less outside it, adapting the length of the track 7 to the length of the opening 4. Furthermore, the connection module 14 comprises guide tubes 29 that will adjust the position of the cables 24 reaching the support beams 8, to separate them from each other and to raise them. Two of the tubes 29 stop at the beginning of the support beams 8, the other two go as far as their ends. The cables 24 project beyond the tubes 29 and the pod 9 is suspended from them at its four corners, extending between and under the two support beams 8.

Operation of the device is simple. After having been inserted onto the track 7, the robot 5 is started so that it runs along the track. It is guided in the cavity 17. It passes on the pod 9 that has a cross-section similar to the cross-section of the cavity 17 and that is an extension of it at that moment. It is then stopped and the pod 9 is lowered into the cell 2 by unwinding the cables 24 of the winch 10 by a manual or mechanical action. The pod 9 reaches the floor 6 and the robot 5 is restarted to move around inside the cell 2. It can then return and get onto the pod 9 again, and the pod is then raised. The robot then returns to the external environment 3 along the track 7.

The invention claimed is:

1. A device for transporting a mobile object into a cell limited by a wall and through an opening in the wall, the device comprising:

a track formed through the opening, fixed to the opening and provided with a longitudinal cavity, the cavity comprising a lower face and side faces for guiding the object along the track, two support beams prolonging the track in the cell and being connected to the track, a pod under the support beams, a winch outside the cell, cables extending from the winch to the pod and from which the pod is suspended, the cables extending along the track and support beams, and guiding means for the cables, said guiding means being provided at least on the support beams, the cables projecting beyond said guiding means at ends suspending the pod.

2. Transporting device according to claim 1, wherein the guiding means comprise longitudinal cableways in the track.

3. Transporting device according to claim 1, wherein the support beams are two, the cables are four, the pod is rectangular and the cables suspend the pod at four corners thereof.

4. Transporting device according to claim 1, wherein the track is composed of modules, the modules being provided with assembly means.

5. Transporting device according to claim 1, wherein the track comprises a stop against the wall of the cell.

6. Transporting device according to claim 2, wherein the guiding means comprise tubes provided on the support means for raising and separating the cables from each other with respect to the cableways.

* * * * *

UNITED STATES PATENT AND TRADEMARK OFFICE

CERTIFICATE OF CORRECTION

PATENT NO. : 8,408,140 B2
APPLICATION NO. : 12/742072
DATED : April 2, 2013
INVENTOR(S) : Vialle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 355 days.

Signed and Sealed this
First Day of September, 2015

Michelle K. Lee
*Director of the United States Patent and Trademark Office*